United States Patent [19]

Mase et al.

[11] Patent Number: 5,310,577
[45] Date of Patent: May 10, 1994

[54] PROCESS FOR PRODUCING PLASTIC LENS

[75] Inventors: Shoji Mase; Noboru Otani, both of Odawara; Motoaki Yoshida, Tokyo, all of Japan

[73] Assignee: Nippon Sheet Glass Co., Ltd., Osaka, Japan

[21] Appl. No.: 839,263

[22] Filed: Feb. 21, 1992

[30] Foreign Application Priority Data

Feb. 21, 1991 [JP] Japan .................................. 3-049105
Jul. 5, 1991 [JP] Japan .................................. 3-165397

[51] Int. Cl.$^5$ ............................................. B05D 5/06
[52] U.S. Cl. .................. 427/164; 427/393.5; 427/412.1; 427/419.5; 427/419.2
[58] Field of Search .............. 427/164, 419.5, 412.1, 427/393.5

[56] References Cited

U.S. PATENT DOCUMENTS

| 4,321,305 | 3/1982 | Castellucci et al. | 428/418 |
| 5,165,992 | 11/1992 | Yajima | 428/328 |

FOREIGN PATENT DOCUMENTS

| 0133223 | 2/1985 | European Pat. Off. |
| 0404111 | 12/1990 | European Pat. Off. |
| 3001060 | 7/1981 | Fed. Rep. of Germany |
| 3636531 | 5/1987 | Fed. Rep. of Germany |

*Primary Examiner*—Janyce Bell
*Attorney, Agent, or Firm*—Wenderoth, Lind & Ponack

[57] ABSTRACT

A process for producing a plastic lens, which comprises:

(1) applying a primer coating composition composed mainly from a blocked polyisocyanate and a polyol onto a surface of a plastic lens substrate and heating the primer coating composition to form a primer layer of a thermoset polyurethane, the blocked polyisocyanate being a polyisocyanate blocked with a $\beta$-diketone, (2) forming a hard coating layer on the primer layer, and (3) vapor-depositing an inorganic material or inorganic materials on the hard coating layer to form a single-layered or multi-layered anti-reflection coating.

6 Claims, No Drawings

PROCESS FOR PRODUCING PLASTIC LENS

DETAILED DESCRIPTION OF THE INVENTION

The present invention relates to a process for producing a plastic lens. More specifically, it relates to a process for producing a plastic lens that is excellent in wear resistance, impact resistance, dyeability, anti-reflection properties, weathering resistance, chemical resistance and adhesion of a coating.

In recent years, plastics which are light in comparison with glass have been attracting attention as materials for eye-glasses, and many plastic lenses having a high refractive index and a low chromatic aberration are on the market. Since the plastic lenses generally have a defect in that they are liable to be scratched, the plastic lenses are usually provided with a silicon-based hard coating layer on the lens surface, and the plastic lenses are also provided with an inorganic material-vapor deposited anti-reflection coating layer on the hard coating layer to prevent surface reflection which causes the flicker of an image.

However, the plastic lenses provided with both the hard coating layer and the anti-reflection coating layer have disadvantage in that they are extraordinarily inferior in impact resistance to plastic lenses provided with no coating layer and plastic lenses provided with only a hard coating layer.

To solve the above problem, Japanese Laid-Open Patent Publication No. 87223/1988 and Japanese Laid-Open Patent Publication No. 141001/1988 proposes a method in which a primer layer of a polyurethane resin is formed between the plastic lens and the hard coating layer.

That is, in the method of each of the above two publications, the polyurethane resin layer is formed by applying a polyurethane resin solution onto a plastic lens and then evaporating the solvent. Thus, the formed polyurethane is a so-called thermoplastic resin having no cross-linked structure. Then, the lens having a layer of the polyurethane is immersed in a hard coating solution to form a hard coating layer. In this case, however, the polyurethane forming the primer layer is often likely to be dissolved and eluted in the hard coating solution to stain the hard coating solution. Further, due to the attack of the solvent, the polyurethane layer often loses its transparency or is whitened.

Japanese Laid-Open Patent Publication No. 114203/1986 discloses a method in which a primer composition containing acrylpolyol and a polyfunctional isocyanate compound is coated on a plastic lens and cured to form a polyurethane layer having a crosslinked structure, although this method does not particularly aim to improve the impact resistance. Since, however, this method uses an isocyanate compound which can react with active hydrogen at room temperature, the reaction between the hydroxyl group of the acrylpolyol and the isocyanate group proceeds during storage of the primer. For this reason, the pot life of the primer is not sufficiently long and is of poor practical use.

It is therefore an object of the present invention to provide a novel process for producing a plastic lens, which is free from the above various problems.

It is another object of the present invention to provide a process for producing a plastic lens, which is free from staining of a hard coating solution by elution of polyurethane when a lens having a polyurethane layer is immersed in the hard coating solution and from whitening of the primer layer.

It is further another object of the present invention to provide a process for producing a plastic lens which is excellent in wear resistance, impact resistance, dyeability, anti-reflection properties, weathering resistance, chemical resistance and adhesion of a coating.

The above objects and advantages and other objects and advantages of the present invention will be apparent from the following description.

The above objects and advantages of the present invention are achieved by a process for producing a plastic lens, which comprises;

(1) applying a primer coating composition composed mainly of a blocked polyisocyanate and a polyol onto a surface of a plastic lens substrate and heating the primer coating composition to form a primer layer of a thermoset polyurethane, the blocked polyisocyanate being a polyisocyanate blocked with a $\beta$-diketone, (2) forming a hard coating layer on the primer layer, and (3) vapor-depositing an inorganic material or inorganic materials on the hard coating layer to form a single-layered or multi-layered anti-reflection coating layer.

The present invention will be further detailed hereinafter.

The plastic lens substrate used in the present invention is not specially limited. Particularly preferred are a plastic lens formed of a polymer obtained by radical-polymerization of a monomer which mainly contains a diethylene glycol bisallylcarbonate of the formula (1),

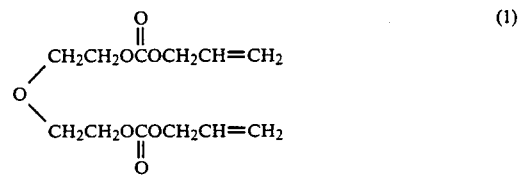

(1)

and a plastic lens formed of a polymer obtained by radical-polymerization of a monomer mixture containing an N-substituted phenylmaleimide derivative. The plastic lens used in the present invention is produced by a polymerization method used for the production of ordinary plastic lenses. For example, the plastic lens is produced by a method in which a monomer mixture is cast into a casting mold formed of a glass mold and a gasket made from an ethylene-vinyl acetate copolymer, heating it at a predetermined temperature for a predetermined period of time, taking out the product from the glass mold, and then post-curing it at a predetermined temperature for a predetermined period of time.

In the step (1) in the present invention, a primer coating composition composed mainly of a blocked polyisocyanate and a polyol is, for example, applied onto a plastic lens substrate surface and heated to cure it, whereby the primer layer is formed. Polyisocyanates are classified into a blocked type and a non-blocked type. The polyisocyanate used in the present invention is limited to a blocked type. The "blocked polyisocyanate" refers to a polyisocyanate of which the isocyanate groups are protected by a blocking agent. The reason for the limitation of the polyisocyanate used in the present invention to a blocked polyisocyanate is as follows: When a non-blocked polyisocyanate is used, the reaction of active hydrogen of the polyol with the isocyanate group proceeds at a room temperature, and the pot life of a primer coating composition containing a non-blocked polyisocyanate is greatly decreased. On the contrary, in the blocked polyisocyanate, the isocyanate group can react with active hydrogen only when the blocking agent is dissociated under heat. As a result, the primer coating composition containing the blocked polyisocyanate has a very long pot life at room temperature.

Examples of the blocked polyisocyanate (polyisocyanate blocked with a β-diketone) used in the step (1) include blocked addition products which are obtained by bonding two or more molecules of each of hexamethylene diisocyanate, isophorone diisocyanate, 4,4'-dicyclohexylmethane diisocyanate and hydrogenated xylylene diisocyanate in various manners to prepare addition products and blocking the isocyanate group of said addition products with a β-diketone. Examples of the addition products include isocyanurates, allophanates, biurets and carbodiimides. As the blocked polyisocyanate, particularly preferred is a polyisocyanate obtained by blocking a cyclic trimer of hexamethylene diisocyanate, i.e., isocyanurate, with a β-diketone. The reason for the use of the blocked polyisocyanate, i.e., polyisocyanate blocked with a β-diketone as a blocking agent is that the blocked polyisocyanate can be cured at a temperature of 100° C. or lower since the blocking agent dissociates at a low temperature, and therefore, such blocked polyisocyanate can be used for the production of a lens of which high heat resistance is not required, e.g. a plastic lens having a glass transition temperature of not higher than 110° C. Examples of the β-diketone preferably include acetylacetone, 2,4-hexanedione, 2,4-heptanedion and 3,5-heptanedion.

Examples of the polyol include compounds having a plurality of hydroxyl groups in the molecule such as polyesters, polyethers, polycaprolactone, polycarbonates and polyacrylates. The blocked polyisocyanate and the polyol are used in such amounts that the isocyanate group/hydroxyl group molar ratio is from 0.5/1 to 1.5/1, particularly preferably from 0.85/1 to 1.2/1. When this molar ratio is less than 0.5/1 or greater than 1.5/1, the primer layer cured is liable to have too small a crosslinked density to improve the impact resistance.

The blocked polyisocyanate and the polyol may be allowed to react in the absence of a curing catalyst.

In the step (1) of the present invention, the primer coating composition is diluted with a solvent. The solvent is selected, for example, from alcohols, ketones, esters and ethers. Other known solvents may be also used. Particularly preferred are diacetone alcohol, ethyl acetate, methyl ethyl ketone and propylene glycol monomethyl ether. These solvents may be used alone or in combination of two or more. The primer coating composition may further contain a leveling agent to improve the coatability and an ultraviolet light absorber and antioxidant to improve the weathering resistance. The primer coating composition can be applied by any one of conventional methods such as a spin coating method and a dipping method without any limitation. The plastic lens may be, as required, subjected to a preliminary treatment such as alkali treatment, plasma treatment and ultraviolet light treatment.

The primer layer is formed on the lens substrate by applying the primer coating composition onto the plastic lens substrate and then heating the primer coating composition up to a temperature between 60° C. and 140°, preferably 80° C. and 130° C. When the temperature is lower than 60° C., undesirably, the curing reaction hardly proceeds since the blocking agent on the blocked polyisocyanate is not dissociated. When the temperature is higher than 140° C., undesirably, the plastic lens is liable to be deformed. Although depending upon the heating temperature, the curing time is, for example, in the range of 10 minutes to 120 minutes.

The thickness of the primer layer is, for example, between 0.5 μm and 5 μm, preferably between 0.1 μm and 3 μm. When the thickness is less than 0.05 μm, the impact resistance is extraordinarily low. When the thickness is greater than 5 μm, the surface accuracy of the primer layer is liable to be greatly poor.

When the primer layer simultaneously satisfies the following two expressions (1) and (2), an interference fringe caused by a refractive index difference between the lens and the hard coating layer can be removed.

$$\sqrt{n_S \cdot n_H} + \frac{|n_S - n_H|}{4} \geq n_P \geq \sqrt{n_S \cdot n_H} - \frac{|n_S - n_H|}{4} \quad (1)$$

wherein:
$n_S$ is the refractive index of a plastic lens substrate,
$n_H$ is the refractive index of a hard coating layer, and
$n_P$ is the refractive index of a primer layer provided that all the indexes are measured against light having a wavelength of 550 nm.

$$d = \lambda/(4n_p) \quad (2)$$

wherein:
d is the thickness of a primer layer,
λ is the wavelength of visible light between 450 nm and 650 nm, and
$n_p$ is as defined in the above expression (1).

The above polyol and/or the above blocked polyisocyanate preferably have/has an aromatic ring.

Examples of the polyol having an aromatic ring include a polyester of terephthalic acid and propylene glycol, a polyester of terephthalic acid and trimethylolpropane, a copolymer of styrene and 2-hydroxyethyl methacrylate, a copolymer of phenyl methacrylate and 2-hydroxyethyl methacrylate, etc.

Examples of the polyisocyanate having an aromatic ring include isocyanurate of tolylene diisocyanate, which is blocked with β-diketone, an adduct of tolylene diisocyanate and trimethylolpropane, which is blocked with β-diketone, a biuret of 4,4'-diphenylmethane diisocyanate, which is blocked with β-diketone, etc.

In the step (2) of the present invention, a hard coating layer is formed on the above primer layer. The hard coating agent for the formation of the hard coating layer is preferably selected from silicon-based resins. Particularly preferred is a composition which mainly contains a co-hydrolysis product of:

(1) inorganic oxide particles having an average particle diameter of from 50 to 200 Å such as colloidal silica and colloidal antimony oxide, or a silane compound having no functional group, and (2) a silane compound having a functional group such as an epoxy group and a methacryl group.

The above component (1) is contained preferably in an amount of 5 to 50% based on the total amount of the components (1) and (2). Examples of the above (2) silane compound having a functional group include γ-glycidoxypropyltrimethoxysilane, γ-glycidoxypropylmethyl-diethoxysilane and γ-methacryloyloxypropyl-trimethoxysilane.

The reason for preference to the silicon-based resin for the formation of the hard coating layer is that the silicon-based resin gives a hard coating layer having a higher hardness than that of a hard coating layer formed from a melamine or acrylic resin. If the hardness is not a factor of great weight, a melamine resin and an acrylic resin may be also used. The hard coating agent may be applied by any one of usually-employed methods such as a dipping method, a spray method and a spin coating method. A dipping method is the most suitable in view of operability. The applied hard coating agent is cured by means of heating, ultraviolet light or electron beam according to types of the hard coating agent, whereby the hard coating layer is formed on the polyurethane primer layer on the plastic lens surface. The hard (cured) coating preferably has a thickness of 2 to 5 μm.

In the step (3) of the present invention, a single-layered or multi-layered anti-reflection coating layer is formed on the above hard coating layer from an inorganic material or inorganic materials. Examples of the inorganic material(s) preferably include metal oxides such as $SiO_2$ and $ZrO_2$ and fluorides such as $MgF_2$.

The single-layered or multi-layered anti-reflection coating layer is formed by any one of a vacuum deposition method, a sputtering method, an ion plating method and an ion beam assist method.

Examples of the multi-layered anti-reflection coating layer include an embodiment which has a layer of $ZrO_2$, a layer of $SiO_2$, a layer of $ZrO_2$ and a layer of $SiO_2$ in this order from the hard coating layer side, these layers having optical thicknesses, in the same order, of $\lambda_0/12$, $\lambda_0/12$, $\lambda_0/2$ and $\lambda_0/4$ in which $\lambda_0$ stands for a wavelength of 520 nm.

As specified above, the plastic lens produced according to the present invention has a primer layer formed of a thermoset polyurethane between the plastic lens substrate and the hard coating layer. Therefore, in spite of the anti-reflection layer formed on the hard coating layer, the plastic lens of the present invention has excellent impact resistance and meets the requirements of U.S. FDA Standard. Further, thin the present invention, even when the lens provided with the primer layer is immersed in a hard coating solution in the step (2), the polyurethane as a primer component is not eluted in the hard coating solution, or the hard coating solution is not stained, since the primer layer is a thermoset polyurethane.

Further, a plastic lens provided with only the primer layer and the hard coating layer, but having no anti-reflection coating layer has also excellent impact resistance, compared with plastic lenses having the hard coating layer alone or those having other primer layer and a hard coating layer.

The present invention will be described further in detail hereinafter by reference to Examples. However, the present invention shall not be limited thereto.

In Examples, lens having a plurality of layers were evaluated on their performances by the following methods.

1) Adhesion of Layer

A cross-cut tape test was carried out in the following manner to evaluate the adhesion of a layer. That is, a layer formed on a lens was cut lengthwise and widthwise at intervals of 1 mm (to form 100 square cuts), and a cellophane adhesive tape was attached thereon and peeled off forcibly. Then, the number, m, of the square cuts remaining on the lens surface was counted, and the result was shown as m/100. For example, "100/100" shows that the layer was not peeled off at all in the cross-cut tape test.

2) Wear Resistance

A hard coating layer formed on a primer layer on a plastic lens substrate was rubbed with #0000 steel wool to examine scratch resistance. The result was evaluated as follows.
A: No scratch by forcibly rubbing.
B: Slightly scratched by forcibly rubbing.
C: Scratched even by moderately rubbing.

3) Dyeability

A plastic lens was dyed by immersing it in a dye bath, prepared by adding 2 parts of an ordinary disperse dye (Plax Brown D, supplied by Hattori Seiko Co., Ltd.) and 3 parts of a Plax dye aid to 1,000 parts of water, at 90° C. for 10 minutes, and the resultant dyed lens was measured for a visible light transmittance with a TOPCON Sunglass Tester (supplied by Tokyo Optical Equipment Co., Ltd.). A dyed plastic lens having a visible light transmittance of not more than 80% was evaluated to have good dyeability.

4) Adhesion of Anti-reflection Coating

An $SiO_2/ZrO_2$ type four-layer anti-reflection coating layer was formed on a substrate having a primer layer and a hard coating layer by a vacuum deposition method. The surface of the formed anti-reflection coating layer was rubbed with #0000 steel wool to examine a change in reflected color. The result was evaluated as follows.
A: No change in a reflected color by forcibly rubbing.
B: Scratched by forcibly rubbing and whitened in the scratched portion, but no change in reflected color in portions other than the scratched portion.
C: A layer was scratched off even by moderately rubbing, and the rubbed portion was completely whitened.

5) Impact Resistance

A plastic lens was evaluated on impact resistance by a steel ball drop test, in which steel balls shown in Table 1 were allowed to drop gravitationally on the center of the lens one by one in the order from the lightest to a heavier one from a height of 127 cm. The weight of a steel ball positioned just before a steel ball which had cracked the lens was taken as a value for impact resistance. Table 2 shows the central thickness of each of lenses used in this test.

TABLE 1

| No. | Reference chart of steel balls | |
|---|---|---|
| | Diameter [mm] | Weight [g] |
| 1 | 6.35 | 1.04 |
| 2 | 7.94 | 2.04 |
| 3 | 8.73 | 2.72 |
| 4 | 9.53 | 3.53 |
| 5 | 10.0 | 4.08 |
| 6 | 10.32 | 4.48 |
| 7 | 11.11 | 5.59 |
| 8 | 11.96 | 6.88 |
| 9 | 12.30 | 7.60 |
| 10 | 12.70 | 8.36 |
| 11 | 13.49 | 10.02 |

TABLE 1-continued

| | Reference chart of steel balls | |
|---|---|---|
| No. | Diameter [mm] | Weight [g] |
| 12 | 14.29 | 11.90 |
| 13 | 15.08 | 13.99 |
| 14 | 15.88 | 16.32 |
| 15 | 16.66 | 18.89 |
| 16 | 17.46 | 21.72 |
| 17 | 18.26 | 24.52 |
| 18 | 19.05 | 28.20 |
| 19 | 19.84 | 31.87 |
| 20 | 20.64 | 35.85 |
| 21 | 21.43 | 40.15 |
| 22 | 22.23 | 44.78 |
| 23 | 23.02 | 49.75 |
| 24 | 23.81 | 55.07 |
| 25 | 24.00 | 56.88 |
| 26 | 25.00 | 63.73 |
| 27 | 25.40 | 66.84 |
| 28 | 26.99 | 80.17 |
| 29 | 28.58 | 95.17 |
| 30 | 30.16 | 111.9 |
| 31 | 31.75 | 130.5 |
| 32 | 33.34 | 151.1 |
| 33 | 34.93 | 173.8 |
| 34 | 36.51 | 198.5 |
| 35 | 38.10 | 225.6 |
| 36 | 41.28 | 286.8 |
| 37 | 44.45 | 358.2 |
| 38 | 47.63 | 440.6 |
| 39 | 50.80 | 534.7 |

6) Appearance

Light from a fluorescent lamp was thrown on a lens in a dark room, and the transparency of the lens was visually examined.

7) Interference Fringe

Monochromatic light having a wavelength of 550 nm was thrown on a lens in a dark room, and the degree of contrast of interference fringe by reflection was visually evaluated. The evaluation was based on the following ratings.

A: Almost no interference fringe was observed.
B: A slight interference fringe was observed.
C: A clear interference fringe was observed.

The above tests on appearance, wear resistance, adhesion of an anti-reflection coating and impact resistance uses lenses having all of a primer layer, a hard coating layer and an anti-reflection coating layer. The above tests on adhesion of layer, dyeability and interference fringe used lenses being provided with no anti-reflection layer but having a primer layer and a hard coating layer.

EXAMPLE 1

(1) Preparation of Plastic Lens Substrate

A mixed solution consisting of 20 parts by weight of 2-chlorophenylmaleimide, 20 parts by weight of a 2,2-bis(3,5-dibromo-4-methacryloyloxyethoxyphenyl)propane, 30 parts by weight of tribromophenyl methacrylate, 25 parts by weight of diallyl isophthalate, 5 parts by weight of polyethylene glycol dimethacrylate (n=4), 1 part by weight of 2-(2'-hydroxy-3',5'-di-tert-butylphenyl)-5-chlorobenzotriazole as an ultraviolet light absorber and 2 parts by weight of tert-butylperoxy(2-ethylhexanoate) as a radical polymerization initiator was cast into a casting mold formed of a glass mold and a gasket made from an ethylene-vinyl acetate copolymer, and heated from 40° C. to 120° C. over 20 hours. The resultant lens was taken out from the glass mold and post-cured at 120° C. for 1 hour. The lens was an excellent optical lens having a refractive index, $n_S$, of 1.595 and having no internal strain. This optical lens was used as a plastic lens substrate in the following procedures.

(2) Preparation of Primer Coating Composition and Application and Curing Thereof A mixture of 13.19 parts by weight of a commercially available polyester type polyol (Desmophen 670-80B, supplied by Sumitomo Bayer Urethane Co., Ltd.), 12.60 parts by weight of a commercially available blocked polyisocyanate (Desmodur LS-2759, a product obtained by blocking the isocyanate group of a cyclic trimer of hexamethylene diisocyanate with $\beta$-diketone, supplied by Sumitomo Bayer Urethane Co., Ltd.), 0.05 part by weight of a commercially available fluorine-containing leveling agent (Fluorad FC-430, supplied by Sumitomo 3M Co., Ltd.) and 74.16 parts by weight of a propylene glycol monomethyl ether as a solvent was fully stirred to form a uniform primer coating composition.

The plastic lens substrate obtained in (1) was subjected to a preliminary treatment with an alkali, and the above-obtained primer coating composition was applied onto the plastic lens substrate by an immersion method (pulling-up rate: 60 cm/minute). Then, the lens was air-dried at room temperature for 15 minutes and heat-treated at 90° C. for 30 minutes to cure the primer, whereby a primer layer having a thickness of 1.5 μm was formed on the lens.

(3) Application and Curing of Silicon-Based Hard Coating Agent

A commercially available dyeable silicon-based hard coating agent (C-339, supplied by Nippon ARC Co., Ltd.) was applied onto the primer layer of the primer layer-formed plastic lens substrate obtained in (2) by an immersion method (pulling-up rate: 40 cm/minute). The resultant lens was air-dried at room temperature for 15 minutes, and then heat-treated at 120° C. for 60 minutes, whereby a hard coating layer having a thickness varying between 2 μm and 4 μm depending upon places and a refractive index, $n_H$, of 1.47 was formed.

(4) Formation of Anti-Reflection Coating Layer

An $SiO_2/ZrO_2$ type four-layered anti-reflection coating layer was formed on the hard coating layer of the plastic lens substrate having the primer layer and the silicon-based hard coating layer, obtained in (3), by a vacuum deposition method. That is, the anti-reflection coating layer consisted of a layer of $ZrO_2$, a layer of $SiO_2$, a layer of $ZrO_2$ and a layer of $SiO_2$ in this order from the hard coating layer side, these layers having optical thicknesses, in the same order, of $\lambda_0/12$, $\lambda_0/12$, $\lambda_0/2$ and $\lambda_0/4$ in which $\lambda_0$ stands for a wavelength of 520 nm. The so-obtained plastic lens having a composite layer was tested, and Table 2 shows the results.

EXAMPLE 2

A mixture consisting of 100 parts by weight of diethylene glycol bisallylcarbonate and 3 parts by weight of diisopropylperoxydicarbonate as a radical polymerization initiator was cast into a casting mold formed of a glass mold and a gasket made from a low-density polyethylene, and the mixture was heated at 40° C. for 4 hour, from 40° C. to 65° C. over 10 hours, further from 65° C. to 85° C. over 5 hours, and at 85° C. for 2 hours. The resultant lens was taken out from the glass mold and post-cured at 130° C. for 2 hours.

The above-obtained lens was excellent optical lens having no internal strain. Then, the procedures of the Example 1 were repeated except for the use of the above optical lens to give a plastic lens having a composite layer. Table 2 shows the test results.

EXAMPLE 3

Example 1 was repeated except for the use of the following primer composition.

A mixture of 16.5 parts by weight of a commercially available acryl polyol (Desmophen A-565, supplied by Sumitomo Bayer Urethane Co., Ltd.), 12.37 parts by weight of a commercially available blocked polyisocyanate (Desmodur LS-2759, supplied by Sumitomo Bayer Urethane Co., Ltd.), 0.05 part by weight of a commercially available fluorine-containing leveling agent (Fluorad FC-430, supplied by Sumitomo 3M Co., Ltd.) and a 71.08 parts by weight of a propylene glycol monomethyl ether as a solvent was fully stirred to form a uniform composition, whereby the above primer composition was obtained.

Table 2 shows the test results.

EXAMPLE 4

Example 3 was repeated except for the use of the same lens substrate as that obtained in Example 2. Table 2 shows the test results.

EXAMPLE 5

50 Parts by weight of styrene, 48.5 parts by weight of 2,2-bis(3,5-dibromo-4-methacryloyloxyethoxyphenyl)-propane, 2.8 parts by weight of diethylene glycol bisallylcarbonate, 1.5 parts by weight of tert-butylperoxyneodecanate and 0.2 part by weight of 2-(2'-hydroxy-3'-methylphenyl)benzotriazole were mixed, and the resultant mixture was stirred. Then, insolubles were removed from the mixture by filtration, and the filtrate was cast into a space formed of two glass molds and a gasket made from a soft polyvinyl chloride. Then, the mixture was heated at 30° C. for 4 hours, from 30° C. to 50° C. linearly over 10 hours, from 50° C. to 70° C. linearly over 2 hours, at 70° C. for 1 hour, and at 80° C. for 2 hours. Thereafter, the gasket and the glass molds were separated, and the resultant lens was annealed for 2 hours to remove an internal strain. The thus-obtained lens was excellent as an optical plastic lens. This lens was measured for a glass transition temperature to show 108° C.

The above-obtained lens as a plastic lens substrate was subjected to the same procedures as those described in Example 1 except that the hard coating agent was cured by heating it at 90° C. for 6 hours. Table 2 shows the test results.

EXAMPLE 6

Example 3 was repeated except that the same lens as that obtained in Example 5 was used as a plastic lens substrate and that the hard coating agent was cured by heating it at 90° C. for 6 hours. Table 2 shows the results.

COMPARATIVE EXAMPLE 1

Example 1 was repeated except for the use of the following primer composition, to give a plastic lens having a composite layer.

A mixture of 32.26 parts by weight of a commercially available thermoplastic polyurethane (LQ3505, supplied by Sanyo Chemical Industries, Ltd.), 0.06 part by weight of commercially available fluorine-containing leveling agent (Fluorad FC-430), 45.12 parts by weight of toluene as a solvent and 22.56 parts by weight of isopropyl alcohol was fully stirred to form a uniform composition, whereby the above primer coating composition was obtained. The primer layer had a thickness of 1.8 μm. Table 2 shows the test results.

COMPARATIVE EXAMPLE 2

Example 2 was repeated except that no primer layer was formed to give a plastic lens having a composite layer. Table 2 shows the test results.

COMPARATIVE EXAMPLE 3

Example 1 was repeated except for the use of the following primer coating composition, to give a plastic lens having a composite layer.

A mixture of 12.76 parts by weight of a commercially available acryl polyol (Desmophen A-565, OH value=89, supplied by Sumitomo Bayer Urethane Co., Ltd.), 1.70 parts by weight of hexamethylene diisocyanate (NCO/OH ratio=1.0) and 0.06 part by weight of a commercially available fluorine-containing leveling agent (Fluorad FC-430) and 85.48 parts by weight of methyl ethyl ketone as a solvent was fully stirred to form a uniform composition, whereby the above uniform primer coating composition was obtained. The primer layer had a thickness of 0.5 μm. Table 2 shows the test results.

COMPARATIVE EXAMPLE 4

Example 5 was repeated except that the primer coating composition was cured by heating it at 120° C. for 15 minutes. Table 2 shows the test results.

TABLE 2

|  | Adhesion of layer | Wear resistance | Dyeability | Adhesion of anti-reflection coating | Central thickness of lens (mm) | Impact resistance (g) | Appearance |
|---|---|---|---|---|---|---|---|
| Example 1 | 100/100 | A | Excellent | A | 1.5 | 55.07 | Excellent |
| Example 2 | 100/100 | A | Excellent | A | 2.3 | 95.17 | Excellent |
| Example 3 | 100/100 | A | Excellent | A | 1.5 | 44.78 | Excellent |
| Example 4 | 100/100 | A | Excellent | A | 2.3 | 80.17 | Excellent |
| Example 5 | 100/100 | A | Excellent | A | 1.5 | 40.15 | Excellent |
| Example 6 | 100/100 | A | Excellent | A | 1.5 | 40.15 | Excellent |
| Comparative Example 1 | 100/100 | C | Excellent | C | 1.5 | 66.84 | Whitened |
| Comparative Example 2 | 100/100 | A | Excellent | A | 2.3 | 18.89 | Excellent |
| Comparative Example 3 | 100/100 | A | Excellent | A | 1.5 | 18.89 | Excellent |

TABLE 2-continued

|  | Adhesion of layer | Wear resistance | Dyeability | Adhesion of anti-reflection coating | Central thickness of lens (mm) | Impact resistance (g) | Appearance |
|---|---|---|---|---|---|---|---|
| Comparative Example 4 | 100/100 | A | Excellent | A | 1.5 | 40.15 | Lens deformed |

EXAMPLE 7

Example 1 was repeated except that the following primer coating composition was used and that the pulling-up rate from the primer coating composition was changed to 10 cm/minute.

A mixture of 6.60 parts by weight of a commercially available polyester polyol (Desmophen 670-80B, supplied by Sumitomo Bayer Urethane Co., Ltd.), 6.30 parts by weight of a commercially available blocked polyisocyanate (Desmodur LS-2759, a product obtained by blocking the isocyanate group of a cyclic trimer of hexamethylene diisocyanate with β-diketone, supplied by Sumitomo Bayer Urethane Co., Ltd.), 0.05 part by weight of a commercially available fluorine-containing leveling agent (Fluorad FC-430, supplied by Sumitomo 3M Co., Ltd.) and 87.05 parts by weight of a propylene glycol monomethyl ether as a solvent was fully stirred to form a uniform composition, whereby the above primer coating composition was obtained. The primer layer had a thickness of 0.090 μm and a refractive index, $n_p$, of 1.533, which satisfied the afore-described expressions (1) and (2). Table 3 shows the test results.

COMPARATIVE EXAMPLE 5

Example 1 was repeated except that no primer layer was formed to give a plastic lens having a composite layer. Table 3 shows the results.

EXAMPLE 8

(1) Preparation of Plastic Lens Substrate 9.4 Grams (0.050 mol) of m-xylylene diisocyanate and 12.2 g (0.025 mol) of pentaerythritol tetra(3-mercaptopropionate) were homogeneously mixed at room temperature, and the resultant mixture was cast into a casting mold formed of a glass mold treated with a silicon-based baking type mold releasing agent and a gasket made from Teflon. Then, the mixture was heated at 45° C. for 3 hours, at 60° C. for 2 hours and at 80° C. for 24 hours to cure it. The resultant lens was an excellent optical plastic lens having a refractive index of 1.59, an Abbe's number of 36 and a specific gravity of 1.34 and having no internal strain. And, the lens was measured for a glass transition temperature to show 90° C. This plastic lens was used as a plastic lens substrate in the following procedures.

(2) Preparation of Primer Coating Composition and Application and Curing Thereof A mixture of 13.92 parts by weight of a commercially available polyester type polyol (Desmophen 670-80B, supplied by Sumitomo Bayer Urethane Co., Ltd.), 11.83 parts by weight of a commercially available blocked polyisocyanate (Desmodur LS-2841, a product obtained by blocking the isocyanate group of a cyclic trimer of isophorone diisocyanate with β-diketone, supplied by Sumitomo Bayer Urethane Co., Ltd.), 0.05 part by weight of a commercially available fluorine-containing leveling agent (Fluorad FC-430, supplied by Sumitomo 3M Co., Ltd.) and 74.20 parts by weight of a propylene glycol monomethyl ether as a solvent was fully stirred to form a uniform a primer coating composition.

The plastic lens substrate obtained in (1) was subjected to a preliminary treatment with an alkali, and the above-obtained primer coating composition was applied onto the plastic lens substrate by an immersion method (pulling-up rate: 60 cm/minute). Then, the lens was air-dried at room temperature for 15 minutes and heat-treated at 80° C. for 60 minutes to cure the primer, whereby a primer layer having a thickness of 1.5 μm was formed on the lens.

TABLE 3

|  | Adhesion of layer | Wear resistance | Dyeability | Adhesion of anti-reflection coating | Central thickness of lens (mm) | Impact resistance (g) | Appearance | Interference fringe |
|---|---|---|---|---|---|---|---|---|
| Example 7 | 100/100 | A | Excellent | A | 1.5 | 28.20 | Excellent | A |
| Comparative Example 5 | 100/100 | A | Poor | A | 1.5 | 4.48 | Excellent | C |

(3) Application and Curing of Silicon-Based Hard Coating Agent

The procedure of Example 1 was repeated except that the hard coating agent was heat-treated at 80° C. for 16 hours.

(4) Formation of Anti-Reflection Coating

The procedure of Example 1 was repeated.
Table 4 shows the test results.

COMPARATIVE EXAMPLE 6

Example 8 was repeated except that the primer coating composition was cured by heating it at 120° C. for 15 minutes. Table 4 shows the results.

TABLE 4

|  | Adhesion of layer | Wear resistance | Dyeability | Adhesion of anti-reflection coating | Central thickness of lens (mm) | Impact resistance (g) | Appearance |
|---|---|---|---|---|---|---|---|
| Example 8 | 100/100 | A | Excellent | A | 1.5 | 225.6 | Excellent |

TABLE 4-continued

|  | Adhesion of layer | Wear resistance | Dyeability | Adhesion of anti-reflection coating | Central thickness of lens (mm) | Impact resistance (g) | Appearance |
| --- | --- | --- | --- | --- | --- | --- | --- |
| Comparative Example 6 | 100/100 | A | Excellent | A | 1.5 | 225.6 | Lens deformed |

What is claimed is:

1. A process for producing a plastic lens, which comprises;
   (1) applying a primer coating composition composed mainly from a blocked polyisocyanate and a polyol onto a surface of a plastic lens substrate and heating the primer coating composition to form a primer layer of a thermoset polyurethane, the blocked polyisocyanate being a polyisocyanate blocked with a β-diketone,
   (2) forming a hard coating layer on the primer layer from a silicon-based resin and
   (3) vapor-depositing an inorganic material or inorganic materials on the hard coating layer to form a single-layered or multi-layered anti-reflection coating.

2. The process of claim 1, wherein the blocked polyisocyanate is a product obtained by blocking a cyclic trimer of hexamethylene diisocyanate with β-diketone.

3. The process of claim 1, wherein the polyol is at least one of polyester polyol and/or acryl polyol.

4. The process of claim 1, wherein the polyol and/or the blocked polyisocyanate have/has an aromatic ring.

5. The process of claim 1, wherein the plastic lens substrate has a glass transition temperature of not more than 110° C.

6. The process of claim 1, wherein the plastic lens substrate is formed of a polymer obtained by radical polymerization of a monomer mixture containing an N-substituted phenylmaleimide derivative.

* * * * *